United States Patent Office 3,265,615
Patented August 9, 1966

3,265,615
CHROMIUM-CONTAINING HYDROFINING
CATALYSTS
Waldeen C. Buss, Pinole, Calif., assignor to Chevron Research Company, a corporation of Delaware
No Drawing. Filed Dec. 5, 1963, Ser. No. 328,199
13 Claims. (Cl. 208—254)

This invention relates to compositions suitable for use as catalysts and their preparation. More particularly, the invention relates to novel chromium-containing compositions and their use as hydrofining catalysts.

The use of Group VI metals in general as active components in hydrofining catalysts has frequently been suggested. Chromium, being a Group VI metal, has been specifically included in enumerations of allegedly suitable metals. Nevertheless, the only Group VI metals actually found to be commercially used in hydrofining catalysts heretofore are molybdenum and tungsten.

It appears that to be active for hydrofining, including hydrodesulfurization and hydrodenitrogenation, the Group VI metal must convert or be converted to the metal sulfide during or before use. In the most common method of preparing catalysts, a porous oxide support such as alumina, silica, silica-alumina, silica-magnesia, etc., is impregnated with molybdenum or tungsten compounds convertible to the oxide by calcination, and calcined to form an oxide catalyst. Also, when coprecipitation or cogellation preparation methods are used, the compounds employed are such that a calcined metal oxide catalyst is produced. Molybdenum and tungsten oxides are readily converted to the sulfides by contact at moderate temperatures of above about 200° F. with $H_2S$, $H_2$ and $H_2S$, or $H_2$ and an organic sulfur compound yielding $H_2S$, including organic sulfur compounds present in the hydrocarbon oil feed to be hydrofined. Chromic oxide in a calcined catalyst, however, is not converted to chromic sulfide by such treatment, not even at such a high temperature as results in excessive loss of catalyst surface area.

An appreciable surface area of above about 50 square meters per gram, preferably above 100 m.²/g. is generally recognized as being necessary in catalysts of the type described, because the reactions catalyzed appear to occur at the surface of the active metal component. This high surface area is usually obtained by distending the active metal component within, throughout, or on a microporus inorganic refractory oxide support of high surface area. Some attempt has been made to provide active metal components in an unsupported form having high surface area. Unsupported nickel sulfide-tungsten sulfide catalysts have been made. Also, it is known that unsupported chromium oxide gels of appreciable surface area can be prepared, but such chromia gels are not active for hydrofining. These chromium oxide gels are not converted to chromium sulfides by known sulfiding techniques.

Thus, it is seen that the reason chromium has not heretofore been used successfully in hydrofining catalysts is because it was not known how to obtain the chromium in the form of a chromium sulfide while also obtaining a high surface area.

The present invention provides a method of preparing a chromium sulfide catalyst of high surface area. In another aspect the invention provides new catalyst compositions comprising chromic sulfide of high surface area as an essential active component. In another aspect the invention provides an unsupported chromium-oxygen-sulfur composition of high surface area. In still another aspect the invention provides an unsupported chromic sulfide catalyst of high surface area. In yet another aspect the invention provides a process for hydrofining hydrocarbon oils employing a catalyst of novel composition and high surface area.

I have found that chromium-containing compositions having catalytic activity can be prepared by employing a sulfate of chromium as the starting material. In particular, I have found that chromic sulfate can be converted to a material of high surface area by controlled heating with flowing hot reducing medium comprising hydrogen. When chromic sulfate is treated with hot flowing hydrogen at temperatures between about 400° F. and 1200° F., oxygen and sulfur are driven out of the chromic sulfate, and the resulting chromium-oxygen-sulfur composition develops high surface area. Although the chromic sulfate itself has virtually no significant surface area, the resulting composition can develop surface area up to 300 square meters per gram, or higher. The developed surface area goes through a maximum, i.e., it declines on continued treating with hot hydrogen at elevated temperatures, such that if the treatment is continued for too long and/or at too high a temperature, most of the developed surface area is lost.

In accordance with one embodiment of the invention an unsupported chromium catalyst is prepared by reducing a sulfate of chromium by treating said sulfate with flowing reducing gas comprising hydrogen at temperatures between 400° and 1200° F., and terminating said treating at a point of high surface area development. The resulting material is an unsupported chromium catalyst in the form of microporous particles having a surface area of at least 50 square meters per gram, consisting essentially of chromium, sulfur, and oxygen combined in relative proportions corresponding to a composition of lower oxygen content than chromous sulfate. In particular, the atomic ratio of chromium to oxygen is at least 0.3, and the atomic ratio of sulfur to chromium is between 0.3 and 1.5.

The chromium-oxygen-sulfur composition can be caused to approach the composition of chromic sulfide, while retaining appreciable surface area, by continued treating of said composition with a sulfiding medium comprising hydrogen and a sulfur compound providing $H_2S$ at between 300° F. and 1100° F. until removal of oxygen from the chromium-oxygen-sulfur composition is substantially completed. The composition of chromic sulfide is approached closely enough such that the composition corresponds to what would be calculated to be a mixture of at least 75% chromic sulfide and the balance chromic sulfate. Preferably the composition corresponds to greater than 85% $Cr_2S_3$, balance $Cr_2(SO_4)_3$. It is not meant by this, and it is not believed, that the composition is actually a mixture of these compounds.

In one method the chromic sulfate can be treated with a mixture of hydrogen and hydrogen sulfide both during the time that oxygen is being driven off from the chromic sulfate to develop high surface area and during the time that the remainder of the oxygen is being driven off and sulfur added to form chromic sulfide. In that case, there need be no definite termination of the treating with hot reducing gas prior to treating with a hot sulfiding medium, as the temperature during the portion of the treating following the development of high surface area can be in the same temperature range.

In preparing an unsupported catalyst the starting material in the preparation method is preferably solid particles consisting essentially of dehydrated chromic sulfate. If hydrous chromic sulfate is employed, during the initial stages of heating the chromic sulfate will dissolve in the water of hydration released as the temperature is raised, forming a melt or slurry which is more difficult to work with. Thus, it is preferred to form the dehydrated chromic sulfate first, if only hydrous chromic sulfate is available, by heating to drive off the water under vacuum. The dehydrated chromic sulfate is then usually in a hard compacted form which can be cut or broken into pieces of the approximate size desired for the final catalyst. Extrusion or pelleting techniques can be applied at this point, or on partially hydrated $Cr_2(SO_4)_3$.

If it is desired to prepare a supported catalyst, the starting material may be prepared by impregnating a microporous inorganic refractory oxide catalyst carrier of high surface area, such as alumina, by immersing it in an aqueous solution of chromic sulfate and drying the impregnated carrier below the temperature at which decomposition of chromic sulfate occurs. In air, at 950° F., chromic sulfate is converted to chromic oxide. Hence the drying should be at temperatures below 950° F., preferably below about 900° F.

The following examples illustrate the practice of the invention and compare the properties of catalysts and compositions prepared in accordance therewith with known and proposed catalytic materials. The first example shows the effect of the temperature of the hot reducing medium and the time of contacting on the surface area of the resulting chromium-oxygen-sulfur compositions.

Example 1

Samples of dehydrated chromic sulfate, $Cr_2(SO_4)_3$, were treated with hot flowing hydrogen for varying times and temperatures, and the surface areas of the resulting materials were then measured, with results as shown in the following table:

TABLE I

| Sample | Treating Conditions | Surface Area, m.²/g. |
| --- | --- | --- |
| (1) | 500° F. for 15 min., and then 750° F. for 30 min. | 170 |
| (2) | Same as (1), and then 940° F. for 30 min. | 270 |
| (3) | Same as (1), and then 950° F. for 30 min. | 316 |
| (4) | Same as (1), and then 950° F. for 150 min. | 258 |
| (5) | Same as (2), and then 1,050° F. for 30 min. | 250 |
| (6) | Same as (3), and then 1,050° F. for 20 min. | 171 |
| (7) | Same as (3), and then 1,050° F. for 150 min. | 52 |
| (8) | Same as (2), and then 1,050° F. for 240 min. | 40 |
| (9) | Same as (5), and then 1,200° for 30 min. | 87 |
| (10) | 500° F. for 15 min., and then 950° F. for 30 min. | 229 |
| (11) | 500° F. for 15 min., and then 1,050° F. for 200 min. | 40 |

The above samples were in the form of particles in the range 16-100 mesh. They can be made in any desirable particle size range for use in a stationary or fixed catalyst bed in a reactor through which reactant fluid can be passed, or as a powder. The chromic sulfate starting material has a very low surface area indicative only of the outer surface of the particles and a lack of porous structure. Since the samples of high surface area are particles of about the same size, it is apparent that a microporous structure of high surface area was developed in the samples which were not heated to too high a temperature or for too long.

From the foregoing data it is apparent that a high surface area is developed at temperatures below 1000° F., and that a good part of the developed high surface area can be retained for a short time at temperatures as high as 1200° F. On the other hand, the material is sintered to a low surface area by exposure of more than two hours to temperatures above 1000° F. By differential thermal analysis it was determined that during the reduction of the chromic sulfate endothermic reactions occur at 250° F. and at 700° F., but that a strongly exothermic reaction occurs at about 900° F. This is suggestive that the temperature during reduction need not exceed about 900° F., though excellent results can be obtained at 950° F. It further suggests that long exposure to temperatures above 900° F. will cause sintering of the catalyst. It is to be noted that the area loss, such as occurred in Samples (6), (7), (8), (9), and (11) in the foregoing example, occurs without accompanying weight loss. Thus, after the surface area developed, the composition did not change although the physical properties did change.

Elemental analysis of Sample (7), having a surface area of 52 m.²/gm., indicated that it contained 67.3 weight percent chromium, 18.7 weight percent oxygen, and 17.8 weight percent sulfur. This corresponds approximately to an empirical formula $Cr_{2.2}SO_2$. Since there is no known compound near this composition, the composition may be explained as a mixture of chromic sulfide, chromic sulfate, and chromic oxide. It is equally possible that the composition is not a mixture at all, but is an unstable crystal structure, which could account for the unusual development of surface area. In any event it appears that the composition is being driven in the direction of chromic sulfide, as the 0.5 atomic ratio of S to O cannot otherwise be explained.

The high surface area materials produced in Example 1 are pyrophoric. They become hot, and the surface area decreases, when exposed to air. However, Samples (4) and (10) retained appreciable surface areas of 149 m.²/g. and 184 m.²/g., respectively, when carefully exposed to slow air flow at 950° F. and at room temperature, respectively.

The following example compares the activity of the catalyst prepared as in Run (2) of Example 1 with other chromia catalysts in a hydrofining process for the purpose of removing nitrogen compounds.

Example 2

A catalyst was prepared by impregnating a commercial alumina catalyst support of high surface area with chromium nitrate, drying, and calcining to form a chromia-alumina catalyst containing 13.5 weight percent chromium and having a surface area of 186 m.²/g. Another catalyst was prepared by forming a chromia gel, by precipitating from a solution of $CrCl_3$ using an organic base and drying at 400° F. in air. This catalyst consisted essentially of chromic oxide, and was similar to catalysts which have been used for the dehydrogenation of butenes to butadiene. Its surface area was 374 m.²/g. These catalysts and the catalyst prepared as in run (2) of Example 1 were then separately used to treat a gas oil distillate of crude petroleum, boiling from about 650° F. to about 930° F., and containing about 600 p.p.m. nitrogen. Treating conditions in each case were 800° F., 1200 p.s.i.g., 2.0 LHSV (volumes of oil per volume of catalyst per hour), with 4000 standard cubic feet of hydrogen per barrel of oil. After 20-24 hours of steady state operation, the runs were terminated, and the catalysts were then analyzed to determine the percent sulfur in them. The results and analyses were as follows:

TABLE II

| Catalyst | Nitrogen in Product,[1] p.p.m. | Denitrification Rate Constant | Weight Percent Sulfur in Catalyst |
| --- | --- | --- | --- |
| $Cr_2(SO_4)_3$ reduced at 500° F., 750° F., and 950° F. | 174 | 2.5 | 45.1 |
| $Cr_2O_3$ gel | 408 | 0.77 | 0.2 |
| $Cr_2O_3$ on Alumina | 346 | 1.1 | 1.2 |

[1] After removing $NH_3$.

Thus it is seen that the catalyst of this invention is between 2½ and 3 times as active for the removal of nitrogen compounds from impure hydrocarbon oils in a hydrofining type process as compared to both an unsupported chromia catalyst and a supported chromia catalyst. Also, 27% of the gas oil feed was hydrocracked to distillates boiling below 650° F. using the catalyst of this invention in the above test.

Particularly to be noted in the above table are the high sulfur content of the catalyst of this invention after use as compared to the low, almost negligible, sulfur content of the other chromium-containing catalysts. The 45 weight percent sulfur is to be compared with 48 weight percent sulfur, which would correspond to pure $Cr_2S_3$. The 45 weight percent sulfur indicates that, if the catalyst is a mixture of compounds, it is about 92–93 percent $Cr_2S_3$ (if the balance is either $Cr_2(SO_4)_3$ or $Cr_2O_3$ or both). These results are particularly indicative that the activity of the catalyst of this invention is due to $Cr_2S_3$, which was not obtained with the other chromia catalysts. The catalyst of this invention became sulfided obviously either by reaction with organic sulfur compounds in the hydrocarbon oil feed or by reaction with $H_2S$ produced from such compounds by reaction with hydrogen in the presence of the catalyst.

It is also possible to produce the high chromic sulfide content catalyst directly, before using it in a hydrofining process, as shown in the following example.

*Example 3*

Dehydrated chromic sulfate was treated by contacting with a mixture of 20% $H_2S$–80% $H_2$ for one-half hour at 500° F., then one-half hour at 750° F., then one-half hour at 950° F., and then one hour at 800° F. The resulting composition had a surface area of 98 square meters per gram and contained 35 weight percent sulfur. This corresponds to a composition which is about 75% $Cr_2S_3$.

Particularly good results are obtained when chromic sulfide prepared in accordance with this invention is used in conjunction with molybdenum sulfide in a hydrofining catalyst to be used for the purpose of hydrocracking and nitrogen removal from hydrocarbon oil. This is a particularly surprising finding because, although it is known to use molybdenum oxide or molybdenum sulfide, alone or supported, for hydrofining, most hydrofining catalysts contain as the active components the sulfides of molybdenum or tungsten together with an iron group metal sulfide such as cobalt or nickel. Thus, it was previously considered that a sulfactive hydrogenation catalyst should contain both a Group VI component and a VIII component. It was not suggested that an advantage could be obtained by using two Group VI components in the absence of a Group VIII component. The following example illustrates this aspect of the invention.

*Example 4*

Preformed alumina extrusions were impregnated with ammonium molybdate, dried, and calcined to produce a molybdenum oxide-alumina catalyst containing 26.3 weight percent Mo with a surface area of 128 m.²/g. A portion of this catalyst was then impregnated with a hot concentrated aqueous solution of $Cr_2(SO_4)_3$, sufficient to provide between 6 and 10 weight percent chromium on the catalyst. The impregnated material was dried overnight under vacuum at 230° F. This material was then reduced by treating with hydrogen for one-half hour at 550° F., one-half hour at 750° F., and one-half hour at 950° F. The reduced material was then treated with a mixture of 10% $H_2S$ and 90% hydrogen at 600° F. for 2½ hours. This treatment produced a chromium sulfide-molybdenum sulfide-alumina catalyst having a surface area of 178 m.²/g. The catalyst was then used to hydrofine the heavy gas oil boiling from 650° F. to 930° F. by passing the oil and 4000 standard cubic feet per barrel of hydrogen into contact with the catalyst at 800° F., 1200 p.s.i.g. 3.0 LHSV. For comparison purposes, the same feed was also treated by contacting in the same way with the 26% molybdenum on alumina catalyst, similarly sulfided, but not containing any chromium. Also, for comparison purposes, the same feed was also treated at the same conditions with a nickel sulfide-molybdenum sulfide-alumina catalyst containing 6–8 weight percent nickel and 20–23 weight percent molybdenum, with a surface area of 124 m.²/g. This latter catalyst was chosen for comparison because, insofar as I am aware, it is one of the most active known catalysts for the denitrification of hydrocarbon oils. The results of these tests are presented in the following table.

TABLE III

| Catalyst | Nitrogen in Product,[1] p.p.m. | Conversion to Distillates Boiling Below 650° F., Percent |
|---|---|---|
| Cr-Mo-Alumina | 24 | 34 |
| Ni-Mo-Alumina | 32 | 34 |
| Mo-Alumina | 74 | 32 |

[1] After removal of $NH_3$. (Feed contained 600 p.p.m. N.)

The above results show that the chromium sulfide-molybdenum sulfide-alumina catalyst is even more active than the superior nickel sulfide-molybdenum sulfide-alumina catalyst. Such results are not to be expected if the chromium is present as chromium oxide.

The catalysts of this invention, prepared in accordance therewith, have surface areas of at least 50 square meters per gram, as determined by BET nitrogen absorption. More particularly, and desirably, the catalysts have surface areas of above 100 square meters per gram, the best examples thereof having surface areas above 200 square meters per gram. The obtaining of such high surface areas in an unsupported metal sulfide catalyst is a special and novel feature of this invention. As mentioned, these high surface areas are obtained in particles large enough for use in fixed beds of catalysts to be contained in a reactor and through which reactant fluid such as hydrocarbon oil can be passed. Thus, the difficulties and disadvantages heretofore encountered when attempting to use unsupported metallic catalysts are avoided. Previously it was necessary to use a highly pulverized metal in order to obtain a reasonable surface area of contacting between an unsupported metal catalyst and reactant fluid, a typical example being the use of Raney nickel, wherein difficulties arise in attempting to separate the catalyst from the reactants and products.

To reiterate, the obtaining of high surface area depends on control of the reduction treatment applied to the chromium sulfate starting material. As shown, the temperature cannot exceed 1200° F. during treatment with hot flowing reducing medium comprising hydrogen for any significant length of time, nor can temperatures of 1100° F. or higher be tolerated for very long. Consequently, lower temperatures of below 1000° F., or up to only about 900° F., are to be much preferred. Control of the temperature is, of course, with reference to developing the maximum desired surface area. For this purpose a somewhat elevated temperature is required to accomplish the result in a reasonable time, probably above about 400° F.

Conversion to the sulfide can be carried out at a lower temperature than the reduction, by contacting with hot flowing sulfiding medium, but the operable range appears to be about the same as for the reduction. Temperatures of above 1000° F. should not be permitted for very long, and the sulfiding is preferably conducted entirely below 900° F. Considerably lower temperatures may be used, though probably a minimum temperature of about 200° F. is required.

The time of treating, both in flowing hot reducing medium comprising hydrogen and flowing hot sulfiding medium comprising hydrogen $H_2S$ or a sulfur compound providing $H_2S$, depends of course on how the treating is carried out. As can be seen from the data herein, the time will be at least one-half hour, even if it is attempted to carry out the conversion of the chromic sulfate to the high surface area material at the maximum temperatures. However, in commercial scale equipment as contrasted to the laboratory scale apparatus used in tests described herein, it may be possible to accomplish the reduction and sulfiding more rapidly by using higher flow rates of gases and through better contacting and control of conditions.

The chromium-oxygen-sulfur composition of high surface area achieved by the present invention will contain an atomic ratio of sulfur to chromium between 0.3 and 1.5 and have an atomic ratio of chromium to oxygen of at least 0.3. The obtaining of a composition within these ranges is, of course, no guarantee that the composition will have the desired high surface area, as that depends on the careful control of the reduction and sulfiding conditions. More usually the atomic ratio of sulfur to chromium is at least one, and preferably greater than one, while the atomic ratio of chromium to oxygen will be greater than one, and more preferably greater than two. In the final sulfactive form, the chromium-oxygen-sulfur composition will correspond to material having a chromic sulfide ($Cr_2S_3$) content above about 75 weight percent, more preferably above 85 weight percent, the most active examples being greater than 90% $Cr_2S_3$. The exact form in which the elements are combined in the catalyst is not known, and it may be a mixture of various chromic and chromous sulfates, oxides, and sulfides.

When the chromium sulfide catalyst is in the form of chromium sulfide supported on an inorganic microporous refractory oxide support or carrier, such as alumina, the chromium contents expressed as metal may amount to between 2 and 30 weight percent of the total catalyst and support. In the novel catalyst composition comprising chromium sulfide and molybdenum sulfide, in combination, supported on a carrier such as a support composed predominantly of high surface area alumina, the chromium content may be between 2 and 20 weight percent of the total catalyst and the molybdenum content may be between 8 and 30 weight percent of the total catalyst, the balance being alumina. Expressed otherwise, the chromic sulfide content of the catalyst may be up to about 40 weight percent, and the molybdenum sulfide content may be up to about 50 weight percent, the remaining 10% or more being the alumina carrier.

In using the catalyst for hydrofining, hydrocracking, or hydronitrogenation, the conditions employed will depend on the nature of the feed and the type and extent of conversion desired, as is well understood in the art. To mention typical conditions, pressures in the range 200–5000 p.s.i.g., temperatures in the range 500–900° F., space velocities in the range 0.1–15 LHSV, and hydrogen throughput or circulation rates of 1000–15,000 s.c.f./bbl. are used. More typical and preferred conditions within these ranges are pressures of 400–3000 p.s.i.g. temperatures of 600–850° F., space velocities of 0.3–3 LHSV, and hydrogen throughput rates of 2000–8000 s.c.f./bbl. When using the new catalyst it is important to remember that high temperatures are to be avoided, especially temperatures of above 900° F. The avoidance of such high temperatures applies not only during use of the catalyst but also during any subseqent regeneration which may be required.

Having now described the invention and the manner of making and using it, what is claimed is:

1. The method of preparing a catalyst comprising chromic sulfide of high surface area as an essential active component, which method comprises treating a sulfate of chromium with flowing hot reducing medium comprising hydrogen at between 400° F. and 1200° F. until a major portion of the oxygen has been removed from the chromium sulfate, whereby the resulting chromium-oxygen-sulfur composition develops high surface area, and then continuing treating with flowing hot sulfiding medium comprising hydrogen and a sulfur compound providing $H_2S$ at between 300° F. and 1100° F. to remove oxygen from, and add sulfur to, said chromium-oxygen-sulfur composition, whereby the composition of chromic sulfide is approached.

2. The method of claim 1 wherein the chromium sulfate to be treated is supported on a microporous inorganic refractory oxide catalyst carrier of high surface area, having been deposited thereon by impregnating said carrier with an aqueous solution of chromic sulfate and drying the impregnated carrier below the temperature at which decomposition of $Cr_2(SO_4)_3$ occurs.

3. The method of claim 1 wherein the chromium sulfate to be treated is provided as solid particles consisting essentially of dehydrated chromic sulfate.

4. The method of claim 1 wherein said flowing hot reducing medium and said flowing hot sulfiding medium are each composed essentially of hydrogen and hydrogen sulfide.

5. An unsupported chromium catalyst in the form of microporous particles having a surface area of at least 50 m.$^2$/gm. consisting essentially of chromium, sulfur, and oxygen combined in relative proportions corresponding to a composition of lower oxygen content than chromous sulfate, the atomic ratio of chromium to oxygen being at least 0.3 and the atomic ratio of sulfur to chromium being between 0.3 and 1.5.

6. The catalyst of claim 5 wherein the atomic ratio of chromium to oxygen is greater than one, and the atomic ratio of sulfur to chromium is at least one.

7. The catalyst of claim 5 wherein the atomic ratio of Cr to O is at least 2, and the atomic ratio of S to Cr is greater than one.

8. The catalyst of claim 5 having a surface area above 200 m.$^2$/gm.

9. A catalyst having a composition corresponding to at least 75% chromic sulfide, in the form of microporous particles having a surface area of at least 50 m.$^2$/gm.

10. A hydrocarbon conversion process for treating a hydrocarbon oil containing nitrogen compounds, which comprises passing said oil and excess hydrogen at elevated pressure and at a temperature below 900° F. into contact with an unsupported chromium catalyst in the form of microporous particles having a surface area of at least 50 square meters per gram and consisting essentially of chromium, sulfur, and oxygen combined in relative proportions corresponding to a composition of lower oxygen content than chromous sulfate, the atomic ratio of chromium to oxygen being at least 0.3 and the atomic ratio of sulfur to chromium being between 0.3 and 1.5, and recovering as a product oil reduced in nitrogen content.

11. A catalyst comprising chromic sulfide and molybdenum sulfide as essential active components on a refractory porous oxide carrier, containing between 2 and 20 weight percent chromium and between 8 and 30 weight percent molybdenum.

12. The method of preparing a hydrofining catalyst of enhanced activity for hydrodenitrogenation, which comprises impregnating a hydrofining catalyst comprising molybdenum oxide supported on a refractory porous oxide carrier with a solution of chromic sulfate, drying the impregnated material below the temperature at which decomposition of $Cr_2(SO_4)_3$ occurs, and treating the dried impregnated material with flowing hot gas comprising hydrogen at between 500° F. and 100° F. and with flowing hot sulfiding medium at between 400° F. and 900° F. until both chromium and molybdenum are present predominantly as sulfides.

13. A hydrocarbon conversion process for treating a hydrocarbon oil containing nitrogen compounds, which comprises passing said oil and excess hydrogen at elevated pressure and at a temperature below 900° F. into contact with an active hydrofining catalyst composed as the essential active components of sulfides of both chromium and molybdenum supported on a refractory porous oxide carrier, and recovering as a product oil reduced in nitrogen content; said catalyst having been prepared by impregnating alumina with solutions of a molybdenum compound and of chromic sulfate, drying the impregnated alumina below the temperature at which decomposition of $Cr_2(SO_4)_3$ occurs, treating the dried impregnated material with flowing hot gas comprising hydrogen at between 500° F. and 1000° F., and treating with flowing hot sulfiding medium at between 400° F. and 900° F. until both chromium and molybdenum are present predominantly as sulfides.

References Cited by the Examiner

UNITED STATES PATENTS

| | | | |
|---|---|---|---|
| 2,544,771 | 3/1951 | Young et al. | 252—467 |
| 2,855,370 | 10/1958 | Lundsted | 252—467 |
| 2,885,349 | 5/1959 | Hansford | 252—439 |
| 2,995,511 | 8/1961 | Herbert et al. | 208—216 |
| 3,114,701 | 12/1963 | Jacobson et al. | 208—254 |
| 3,140,994 | 7/1964 | Rodman et al. | 208—254 |

DELBERT E. GANTZ, *Primary Examiner.*

S. P. JONES, *Assistant Examiner.*